United States Patent [19]

Regife Vega et al.

[11] 3,923,976

[45] Dec. 2, 1975

[54] PROCESS FOR RECOVERY OF ZINC FROM SOLUTIONS THAT CONTAIN IT AS A RESULT OF EXTRACTION WITH SOLVENTS FOR THEIR ADAPTATION TO ELECTROLYSIS

[76] Inventors: Jose Manuel Regife Vega, San Ernesto 12; Eduardo Diaz Nogueira, Av. Mediterraneo 47, both of Madrid, Spain

[22] Filed: May 31, 1973

[21] Appl. No.: 365,718

[30] Foreign Application Priority Data
Aug. 10, 1972 Spain .................................. 405759
June 3, 1972 Spain .................................. 403506

[52] U.S. Cl. ................................... 423/99; 204/119
[51] Int. Cl.² ....................... C01G 9/06; C25C 1/16
[58] Field of Search .......... 423/99, 100; 75/101 BE, 75/120; 204/118–119

[56] References Cited
UNITED STATES PATENTS

| | | | |
|---|---|---|---|
| 2,980,607 | 4/1961 | Mock et al. | 75/101 BE |
| 3,055,754 | 9/1962 | Fletcher | 75/101 BE |
| 3,131,998 | 5/1964 | Swanson | 75/101 BE |
| 3,488,184 | 1/1970 | Hesler | 75/101 BE |

FOREIGN PATENTS OR APPLICATIONS

| | | | |
|---|---|---|---|
| 1,536,643 | 7/1968 | France | 75/101 BE |

*Primary Examiner*—R. L. Andrews

[57] ABSTRACT

A process for recovery of zinc from solutions by means of organic solvents to produce electrolytic zinc using two extraction cycles, the first cycle comprising using an organic phase of limited miscibility in water, washing the organic extraction and then re-extracting a zinc rich purified extract, and the second cycle comprising treating the zinc solution from the first cycle to similar operations to obtain an aqueous zinc rich extract suitable for electrolysis and the optionally carrying out an organic treatment operation.

11 Claims, 1 Drawing Figure

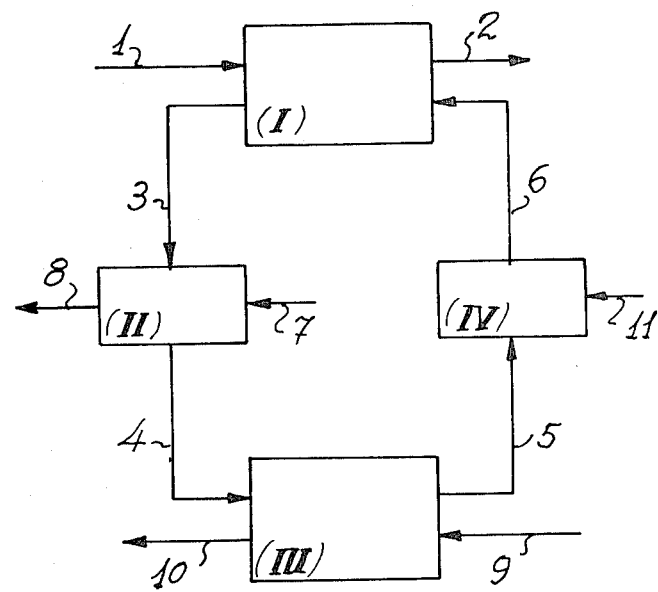

PROCESS FOR RECOVERY OF ZINC FROM SOLUTIONS THAT CONTAIN IT AS A RESULT OF EXTRACTION WITH SOLVENTS FOR THEIR ADAPTATION TO ELECTROLYSIS

In the process of leaching of non-ferrous metals from iron pyrites, concentrates or complex minerals, pyrites ashes, natural liquids of acid leaching of zinc ores, some liquids are handled in which the zinc is accompanied by or rendered impure by the presence of other ions.

The object of this invention is the separation of zinc from the impurities which usually accompany it in solution to obtain a pure zinc solution, from which it can then be recovered by hydrometallurgical precipitation methods, either chemically or by the use of electrolysis.

Commercial electrolysis of zinc is very much governed by the composition of the electrolyte. Efficient and profitable electrolysis of any metal depends on electrolytes in which the concentrations of zinc, sulphates, acidity and impurities have relatively small levels of variation. However, there are countless solutions in the field of hydrometallurgy which, either because of an insufficient concentration of zinc, or through having a limited degree of purity or through having been treated with hydrochloric, sulphuric or nitric solvents, the zinc cannot be recovered by conventional electrolysis.

The object of the said invention is to purify and concentrate the zinc from hydrochloric, sulphuric or nitric solutions and obtain a pure, concentrated zinc sulphate solution, suitable for connection to a conventional electrolysis circuit. To do this, a solvent extraction technique is used, in which the extraction agent in the first extraction cycle is a liquid anion exchanger and in a second cycle, a liquid cation exchanger.

The application of this process requires that the dissolved zinc should be in a chloride medium during the first cycle, which is accomplished, either because the liquid comes from a hydrchloric acid leaching or by the incorporation of a reagent in the form of an acid or salt (sodium chloride, ammomium chloride, calcium chloride etc) in the solution containing the zinc. The attachment of the zinc on to the extraction agent is due to the fact that in chloride ion solutions, this element forms an anionic type of chloride complex, $Cl_4Zn^{--}$, as in the equilibrium:

$$4\ Cl^- + Zn^{++} \rightleftarrows Cl_4Zn^{--} \qquad (1)$$

To extract the zinc anion complex, an organic phase composed of three basic constituents is used: an extraction agent, a modifier and a diluting agent. The first, which is the one which actually extracts the zinc, could be a primary, secondary or tertiary amine or a quaternary ammonium base, with large alkyl chains, hardly soluble in water and with a molecular weight above 200. The second constituent of the organic phase — the modifier — could be optional and its purpose is to facilitate phase separation during extraction. Alcohols of 8 – 14 carbons give the desired results. Finally, there is a diluting agent, which acts as a carrier for the two reagents already mentioned and which lowers the viscosity of the medium. For this purpose, a hydrocarbon or distilled petroleum fraction, either kerosene or similar, can be used.

The first extraction cycle of the process in the said invention consists of the two basic stages of extraction and re-extraction and a third stage, washing.

Zinc extraction is carried out by an ion interchange mechanism, between chloride from the amine compound and the zinc ion complex. In the case of tertiary amine chloride ($R_3HN\ Cl$), the equilibrium can be represented by the following equation:

$$2R_3NH\ Cl + Cl_4Zn^{--} \rightleftarrows (R_3NH)_2\ Cl_4\ Zn + 2\ Cl^- \qquad (2)$$

The displacement of this reaction towards the right — the direction of extraction — increases in proportion to the concentrations of $Zn^{++}$ and $Cl^-$, especially the latter, which appears in the formation constant of the zinc anion complex with the fourth power of its concentration or activity.

It has been proved experimentally that zinc extraction does not begin to be significant until the concentration of chlorides in the initial aqueous medium is at least 1.5 molar in that anion. The most suitable concentration of chlorides is relative to the concentration of zinc in the solution and the nature and contents of the impurities accompanying the zinc. The most suitable chloride concentration is 2 mol/1. If this concentration is stronger, the formation of chloride-containing anion complexes from some of the impurities is facilitated. These complexes, although less stable and more difficult to form, can, by their presence in the organic phase, render the final zinc solutions slightly impure. If, under certain circumstances or through the use of a special liquid, one is advised to use chloride concentrated solutions (above 3M) the results of the process will not be affected, as the impurities extracted along with the zinc will be removed in the washing stage, which is inserted between the extraction and re-extraction stages, and is described later.

The sulphate ion, which contains all the zinc ore lyes or leaching liquids, does not take an active part, since it is known that the order of attachment to an amine of quaternary ammonium base, progresses:

$$SO_4^{--} < SO_4H^- < Cl^- < Cl_4\ Zn^{--}$$

If it happens that some sulphate attaches itself to the organic phase, it is displaced afterwards by the zinc anion complex, and is combined with this anion.

Zinc extraction can be carried out with any solvent extraction equipment preferably with mixer/settlers using counter current action, in various stages. This type of equipment has been used in our continuous tests.

The agitation or contact time necessary to obtain equilibrium on each extraction stage depends on the concentrations in the organic and aqueous phase and the degree of agitation. In all cases it was less than 10 minutes, but values of between 0.5 and 3 minutes predominated.

The presence of a modifier in the organic phase does not present any problem to phase separation.

In a counter current extraction between a zinc bearing solution of approx. 2 moles of chloride and with an organic phase with the constituents already mentioned, more than 90 percent of the dissolved zinc can be extracted, giving an organic extract which contains zinc and in which the only impurity is some form of cation. If it is wished to eliminate these impurities, which can also be extracted, it is recommended that a washing stage takes place between the two extraction stages.

To this end, one can use water, hydrochloric acid solution of one of its salts as washing liquids. In this stage, as well as the impurities, some zinc is re-extracted, so that the washing solution is recycled to the extraction stage for zinc recovery. By regulating the volumetric flow ratio of organic extract to washing liquid as required, it has been possible to lessen the amount of zinc re-extracted in the washing solution to a fraction below 10 percent. The second basic stage is re-extraction. During this stage, the zinc contained in the organic phase is transferred to another aqueous phase. Acid, saline or basic solutions can be used for this purpose; however, the most economical liquid is water. In fact, by re-extracting with water the ions $Cl_4Zn^{--}$ attached to the amine, are transferred into simple ions.

$$(R_3HN)_2 Cl_4Zn + (H_2O) \rightleftarrows 2 R_3 HN Cl + Zn^{++} + 2 Cl^- \quad (3)$$

Re-extraction is based on this equilibrium, leaving an organic phase when the amine compound is in chloride form, being directly recycled to extraction.

Re-extraction can also be carried out with acid, neutral or alkaline solutions, which contain an anion with greater power of attachment to the amine than the ($Cl_4Zn^{--}$). Such is the case with the nitrate ion, but this means the introduction of foreign ions, which must be extremely pure in order not to contaminate the zinc aqueous extract.

Temperature has a slightly favorable effect on the equilibrium of re-extraction and temperatures of up to 50°C can be used, in accordance with the risk of inflammability in the organic phase; however, it is a factor which must be considered from an economic view point.

Re-extraction is a somewhat slower process than extraction, and, as in extraction, depends primarily on the degree of agitation. In all the kinetic experiments with mechanical agitation, during which the organic extracts and water are separated, equilibrium was reached in under 12 minutes, but values of less than 5 minutes of agitation were most common.

The process can be applied to the separation of zinc from impure solutions, and provided that chloride ions are contained in concentration of more than 1.5 molar, an extremely pure zinc chloride solution is obtainable.

The purpose of the process is to produce electrolytic zinc from a zinc solution obtained in the first extraction cycle previously described. To this end, a second solvent extraction cycle is used which changes the zinc chloride solution into a zinc sulphate solution, which is concentrated and pure enough to enable conventional zinc electrolysis to take place.

To extract the zinc during the second cycle, a phase comprising two basic constituents is used: an extraction agent and a diluting agent. In certain circumstances, a third constituent is incorporated into the organic phase, which acts as a modifier.

The extraction agent comes under the general classification of organic acids of high molecular weight, so that they are only slightly miscible with water. Bearing this in mind, the following have been tested: carboxilic acids with more than eight carbons, which are derivatives of the petroleum industry, halogenated fatty acids and alkyl phosphoric acid.

The second constituent of the organic phase is the diluting agent which acts as a carrier for the extraction agent and lessens the viscosity of the organic medium. For this, a hydrocarbon or distilled petroleum fraction of a kerosene or similar nature can be used. When the concentration of the extraction agent in the organic phase is increased, a third constituent can be used with the aim of facilitating phase separation during extraction and preventing a third phase being formed through insolubility. This is the function of the modifier, which has been tested with positive results with alcohols of 8 – 14 carbons and alkyl phosphate esters.

The extraction mechanism is cation interchange and can be simply represented by the reaction:

$$(RH)_2 + Zn^{++} \rightleftarrows R_2 Zn + 2 H^+ \quad (4)$$

when RH is one of the organic acids mentioned. Generally, all the acids mentioned are weak, and extract the zinc at a pH level of 2 – 6 depending on the acid strength or pK of the acid tested. In any case, for the reaction (4) to move towards the right — direction of extraction — it is necessary to add an alkali. For economic reasons, the most suitable reagents are calcium, magnesium, ammonium or sodium alkalis. Especially suitable is milk of lime. However, when zinc is recovered from a sulphate medium, the use of lime presents problems as during the extraction, hydrated calcium sulphate is produced, which creates difficulties in phase separation.

The neutralization of hydrogen ions formed as the extraction of zinc progresses can be carried out during the extraction stage, by adding regulated amounts of alkali to maintain the pH level at a point between the minimum of extraction and of zinc precipitation. In this case:

$$H^+ + OH^- \rightleftarrows H_2O \quad (5)$$

Once the hydrogen ions have been removed, extraction is virtually complete in only two stages. There is also another possibility, which consists of treating the organic phase, in a stage preceding extraction, by converting the acid — the extraction agent — into its calcium or magnesium salts. At this stage the reaction is:

$$2RH + Ca(OH)_2 \rightleftarrows R_2Ca + 2H_2O \quad (6)$$

In feeding an organic phase into the extraction process in which the extraction agent is in the form of a salt, the zinc is extracted by the same mechanism of ion exchange, by interchanging two metallic cations, differentiated by the degree of acidity:

$$R_2 Ca + Zn^{++} \rightleftarrows R_2 Zn + Ca^{++} \quad (7)$$

The general order for the extraction of metals by organic acids is the following:

$$Fe^{3+} > Al^{3+} > Cu^{2+} \; Zn^{2+} > Fe^{2+} \; Mn^{2+} > Ca^{2+} \; Mg^{2+}$$

This preference indicates that the constituents preceding zinc must be removed before the zinc can be extracted. On the other hand, organic salts of the cations after zinc can be used to interchange with zinc.

When there is any copper present in the solution from which the zinc is to be extracted, the appearance of this cation can be eliminated by using alkyl phosphoric acid, especially di-2-ethyl hexyl phosphate. Using these acids, zinc can be extracted at a lower pH than copper. It is therefore pointed out that by properly choosing the extraction agent and the pH in which to carry out extraction, a selective extraction of zinc is achieved. The second cycle of the said process comprises two basic stages of extraction and re-extraction and two secondary, optional stages of washing and organic treatment.

Zinc extraction can be carried out using any liquid-liquid extraction equipment, preferably mixers-settlers, working counter-currently, in various stages. This type of equipment has been used in our continuous tests, and the number of stages necessary to extract 95 percent of the zinc was always less than five. With a good pH control, the number of extraction levels can be reduced to two.

The agitation or contact time necessary to achieve equilibrium in each extraction stage depends on the concentrations of the organic and aqueous phases, the pH and the degree of agitation. In all cases, it was less than 10 minutes, values of less than 3 minutes were most common.

The concentration of the extraction agent is determined in relation to the concentration of zinc to be recovered and the nature of the acid chosen. In the tests it varied between 5 and 35 percent v/v.

During phase separation, when the extraction pH was well controlled and when the organic phases did not have a large concentration of organic acids ( < 25 percent v/v) no difficulties arose. In one case, difficulties were overcome by using organic phases which contained a modifier, consisting of alcohols with 8 – 12 carbons or tributyl phosphate. During extraction, it is necessary to control the pH especially when the organic phase contains the extraction agent in its acid form. This is done by the addition of alkalis in one or more of the extraction stages.

In a counter-current extraction between a zinc bearing solution and an organic phase with the constituents already mentioned, in which the pH is well controlled, more than 95 percent of the dissolved zinc can be extracted, giving an organic extract which contains zinc and only a trace impurities.

If it is wished to remove these impurities by extraction, it is recommended that a washing stage be inserted between extraction and re-extraction, as the chloride ion in the organic extract should be prevented from passing on to re-extraction.

For this purpose, water or an acid, base or salt solution could be used for washing; preferably, containing an anion which complements the impurity which is also extracted. The second basic stage of the process is re-extraction. In this stage the zinc which is contained in the organic phase is passed on to an aqueous stage. Strong acid solutions can be used, especially sulphuric acid, zinc sulphate acid solution or a spent electrolyte. The principle of re-extraction is based on displacement of the reaction (4) towards the left. Conditions for re-extraction are varied in terms of acidity of the re-extracted solution and the volumetric flow ratio of organic extract to the re-extraction solution.

However, as the object is to obtain an aqueous extract, from which at a later stage of electrolysis the zinc is deposited, the conditions stated will be chosen in accordance with the method of electrolysis used.

Temperature has a slightly favorable effect on equilibrium in re-extraction and temperatures up to 50°C can be used, in keeping with the risk of inflammability in the organic phase. Re-extraction is somewhat slower than extraction and, as in the latter, depends basically on the degree of agitation. In all the kinetic tests with mechanical agitation, in which organic extracts and re-extraction acid solution were separated, equilibrium was reached in under 12 minutes, values less than 7 minutes of agitation being most common.

After re-extraction, the organic phase is deprived of zinc and the extraction agent is transformed to its acid form. Sometimes, it is thought necessary to either partially or totally neutralize this acid before the organic extract is recycled to the extraction stage. This is carried out in the optional stage involving treatment or preparing of the organic phase. This stage is considered almost essential when calcium hydroxide or magnesium hydroxide is used an a neutralizing reagent. To do this, the re-extracted organic phase is brought into contact with lime or magnesium wash which, in accordance with reaction (6) neutralizes the acid, and forms the corresponding calcium or magnesium salt.

The neutralizing liquid is kept within a closed circuit and alkali is incorporated as required.

The said invention is illustrated with several examples and to facilitate understanding, a drawing is also included.

EXAMPLE 1

An explanatory example of the first cycle in this process is given below. A zinc or leaching liquid is used of the following composition:

| | | |
|---|---|---|
| Zinc | 38 | g/l |
| Copper | 0.03 | " |
| Ferrous iron | 3 | " |
| Ferric iron | 5 | " |
| Cobalt | 0.02 | " |
| Sodium | 15 | " |
| Other cations | 0.1 | " |
| Sulphates | 102 | " |

120 g/l of sodium chloride is added to this solution, which undergoes counter current extraction with an organic phase of the following composition:

| | |
|---|---|
| Tricapryl amine chloride | 20% v/v |
| Decylic alcohol | 5% v/v |
| Petroleum kerosene (CAMPSA) | 75% v/v |

The raffinate or effluent from this extraction stage is of the following composition:

| | | |
|---|---|---|
| Zinc | 0.05 | g/l |
| Copper | 0.02 | " |
| Ferric iron | 4.7 | " |
| Ferrous iron | 3.0 | " |
| Cobalt | 0.02 | " |
| Sodium | 63 | " |
| Sulphates | 102 | " |
| Chlorides | 29 | " |

The organic phase has extracted more than 99 percent of the zinc, with a concentration of 11.7 g/l. The only appreciable impurity is ferric iron, which is removed in the washing stage with water. To prevent the zinc being re-extracted in any considerable quantity in this stage, a high ratio of organic phase to water is used. The results are:

| | |
|---|---|
| Zinc in the liquid after washing | 6% |
| Ferric (acid) iron " | 95% |

After washing, the organic extract is re-extracted counter-currently using water, but this time in the ratio 2 – 2.5 volumes of organic phase to each volume of water.

EXAMPLE 2

Another example is given below in which all the extraction agents which have been enumerated can be used to extract zinc during the first cycle.

To this end, organic phases were prepared which contained amine compounds to 20 percent v/v, decyclic alcohol 5 percent v/v and CAMPSA petroleum kerosene 75 percent v/v.

The amines and quaternary ammonium bases were commercial products; they are given below with their trade name, type and manufacturer:

| Trade name | | |
|---|---|---|
| Ambedite XLA | Primary amine | Rohm-Haas Co. (U.S.A.) |
| Amberlite LA-2 | Secondary amine with branched chains | '' |
| Adogen 364 | Tertiary amine with linear chains | Ashland Chemical Co. (U.S.A.) |
| Adogen 382 | Tertiary amine with branched chains | '' |
| Aliquat 336 | Quaternary ammonium base. | General Mills Inc. (U.S.A.) |

These organic phases were saturated with an aqueous solution as follows:

| | | |
|---|---|---|
| Zinc | 27 | g/l |
| Total iron | 6 | '' |
| Sodium | 90 | '' |
| Sulphates | 105 | '' |
| Chlorides | 115 | '' |

In every case, the zinc anion complex was extracted, giving organic extracts as follows:

| Organic phase | Zinc in organic extract |
|---|---|
| Amberlite XLA-3 | 3.6 g/l |
| Amberlite LA-2 | 8.9 g/l |
| Adogen 364 | 11.6 '' |
| Adogen 382 | 10.3 '' |
| Aliquat 336 | 12.7 '' |

EXAMPLE 3

This example demonstrates the results obtained from the second zinc extraction cycle, carried out continously in the laboratory. FIG. 1 is a diagram of the flow tested. The stages of the process are identified by Roman numerals and the main flows by Arabic numerals.

In this test, the process consists of the following stages:

| | |
|---|---|
| Extraction | I |
| Washing | II |
| Re-extraction | III |
| Treatment of organic phase | IV |

An aqueous extract from a preceding zinc recovery stage by solvent extraction was used, in which the extraction agent was a tertiary amine of high molecular weight. The resulting liquid from this stage had the following composition:

| | | |
|---|---|---|
| Zinc | 27 | g/l |
| Chlorides | 30 | '' |
| Impurities | 0.2 | '' |

From this liquid it was necessary to obtain a solution suitable for electrolysis. For this reason, a solvent was used which could be readily assimilated by a spent electrolysis.

In stage (II), washing, water was used to eliminate traces of chlorides.

To make the process as profitable as possible, milk of lime was used (flow 11). The neutralizing of the organic phase acid is carried out in a closed circuit, (stage IV), and the alkali is added as necessary.

Immediately, the flow rate and composition of the main flows in the process are recorded.

| Flow no. FIG. 2 | Description | Flow-Rate ml/min. | Zn | Cl | Composition in g/l, $H_2SO_4$ | Ca |
|---|---|---|---|---|---|---|
| 1 | Aqueous feed | 100 | 27 | 30 | — | — |
| 2 | Effluent or raffinate | 100 | 0.1 | 30 | — | 16 |
| 3 | Organic extract | 105 | 25.6 | 0.1 | — | — |
| 4 | Washed organic extract | 105 | 25.6 | 0.05 | — | — |
| 5 | Re-extracted organic phase | 105 | 0.1 | — | 0.1 | — |
| 6 | Treated organic phase | 105 | 0.1 | — | — | 15 |
| 7 | Water for washing | 10 | — | — | — | — |
| 8 | Liquids from washing | 10 | 0.1 | 1 | — | — |
| 9 | Re-extraction solution | 38 | 48 | — | 115 | — |
| 10 | Aqueous extract | 38 | 119 | — | 7–8 | — |
| 11 | Neutralising wash | | | | | 200 |

EXAMPLE 4

In this example, all the different extraction agents which have been enumerated can be used to extract zinc in the second cycle. Organic phases were prepared which contained carboxilic acid, halogenated alkly and acids to 20 percent v/v, decylic alcohol to 5 percent v/v and CAMPSA petroleum kerosene 75 percent v/v.

These organic phases were saturated with a solution of zinc chloride which contained 22 g/l of zinc. The results were as follows:

| Extraction Agent | Supplier | g/l of Zn in organic base |
|---|---|---|
| Naphthenic acid | Shell Sdad. Petrolifera Espanola, S.A. | 26.3 |
| Alpha-bromo-lauric | Israel Mining Industries (Israel) | 22.6 |
| Di-2-ethyl hexyl phosphate | Union Carbide (U.S.A.) | 19.7 |

Having described the nature of the invention and the method of carrying it into practice, it should be stated that the facts previously mentioned may be subject to slight alteration, but the basic principle will remain unchanged.

NOTE

The Patent of Invention applied for is to be known as: "PROCESS OF RECOVERY OF ZINC FROM SOLUTIONS CONTAINING ZINC BY SOLVENT EXTRACTION FOR USE WITH ELECTROLYSIS" in accordance with the essential characteristics of the claims.

We claim:

1. Process for preparation of zinc for electrolytic deposition from solutions containing zinc and chloride ions by a two-cycle extraction, the first cycle of which includes;

adjusting the chloride solution to at least 1.3M; extracting zinc from said solution by means of an organic solution including at least one member of a class of extracting agents selected from an amine or a quaternary ammonium compound of minimal solubility in water, said agents used in combination with a compatible organic diluent to serve as a carrier and viscosity reducer for said extracting agent; and re-extracting with an aqueous solution to obtain a zinc enriched solution;

and a second cycle including;

extracting the zinc enriched aqueous solution of the first cycle from which more reactive metal cations have been removed, with a high molecular weight organic acid in admixture with a diluent carrier said diluent present to reduce viscosity;

re-extracting with an aqueous solution containing sulphate ions to prepare an electrolytic solution for zinc deposition.

2. The process of claim 1 in which a washing step is carried out after the organic extraction of the first cycle.

3. Process of claim 1 in which a washing step is carried out after the organic extraction of the second cycle.

4. Process of claim 1 in which the zinc solution of the first cycle contains between 1.5 and 2M chloride ions.

5. Process of claim 1 in which the organic phase of solvent used in the first cycle has alkyl chain with a molecular weight above 200.

6. Process of claim 1 in which a modifier consisting of an alcohol with 8–14 carbon is added to the organic extraction phase of the first cycle.

7. The process of claim 1 in which organic extraction solvent of the second cycle contains at least one member of a class consisting of alcohols containing 8–14 carbon atoms and phosphated alkyl esters.

8. Process for claim 1 in which the organic acids used in the second cycle is at least one member of the group consisting of petroleum derivative carboxylic acids, halogenated fatty acids, fatty carboxylic acids and alkyl phosphoric acids.

9. Process of claim 1 in which the extraction in the second cycle is carried out under controlled pH by adding a soluble alleate to neutralize the acid not later than during the extraction.

10. Process for preparation of zinc for electrolytic deposition from solutions containing zinc and chloride ions by a two-cycle extraction comprising a first cycle including the steps of preparing a solution containing zinc and chloride ions in which the chloride ions are present in a concentration of from 1.5–2M; extracting zinc from said solution by an organic solution including at least one member of a class of extracting agents selected from an amine or a quaternary ammonium compound of minimal solubility in water and having large alkyl chains with said compound having a molecular weight greater than 200, and a compatible organic diluent to serve as a carrier and viscosity reducer for said extracting agent;

washing said solution; and re-extracting with an aqueous solution to obtain a zinc enriched solution; and a second cycle including;

extracting the enriched aqueous solution of the first cycle with high molecular weight organic acids in a diluent carrier and viscosity reducing agents;

washing the solution; and re-extracting with an aqueous solution containing sulphate ions to prepare an electrolytic solution for zinc deposition.

11. Process for preparation of zinc for electrolytic deposition of solutions containing zinc and chloride ions by a two-cycle extraction comprising a first cycle including; preparing a solution containing zinc and chloride ions; extracting zinc from said solution by organic solutions including at least one member of a class of extracting agents selected from an amine or a quaternary ammonium compound of minimal solubility in water in conjunction with a compatible organic diluent to serve as a carrier and viscosity reducer and an alcohol with 8–14 carbon atoms; and extracting with an aqueous solution to obtain a zinc enriched solution; and a second cycle including; extracting the enriched aqueous solution of the first cycle with high molecular weight organic acids, and at least one member of the class consisting of alcohols containing 8–14 carbon atoms and phosphated alkyl esters and a diluent carrier to reduce viscosity; re-extracting with an aqueous solution containing sulphate ions to prepare an electrolytic solution for zinc deposition.

* * * * *